May 17, 1966 E. A. ANDERSON ETAL 3,251,079
APPARATUS AND METHOD FOR MAKING WELD NUTS
Filed May 23, 1963 3 Sheets-Sheet 1
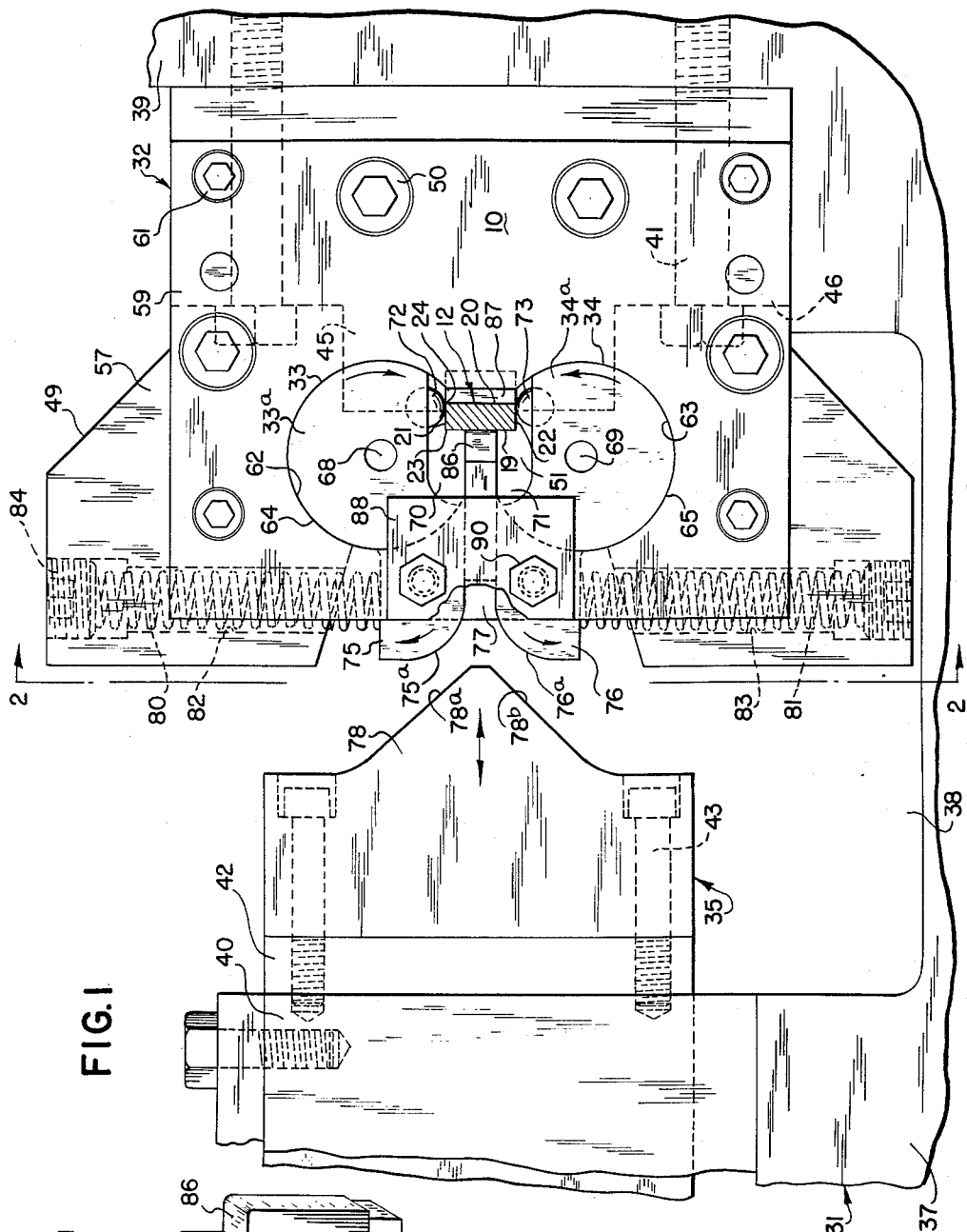
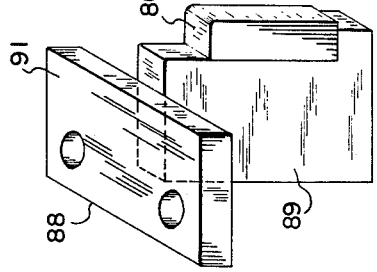
INVENTORS
EDWARD A. ANDERSON
BY AUGUST S. CLAUSE
ATTORNEYS

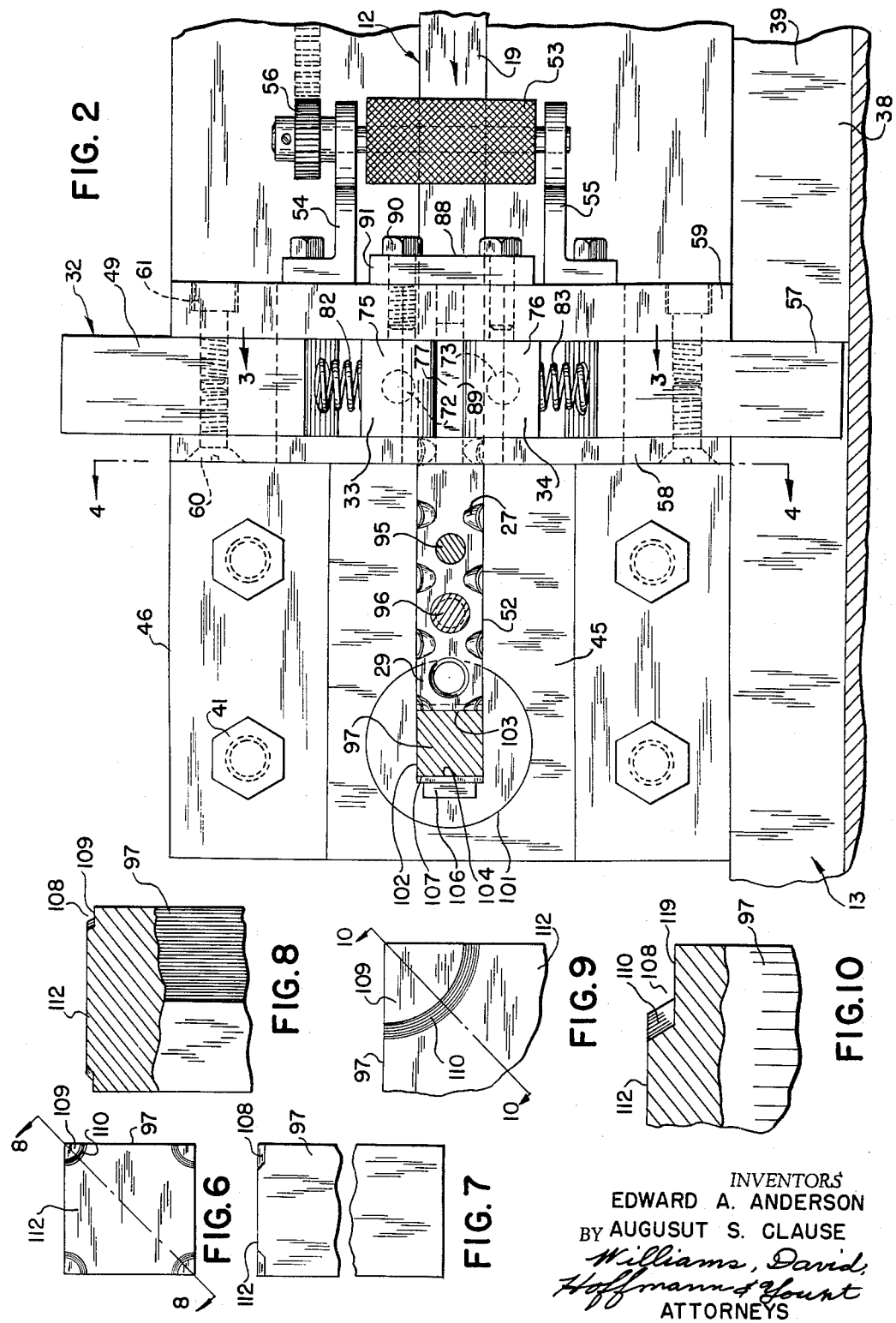

May 17, 1966 E. A. ANDERSON ET AL 3,251,079
APPARATUS AND METHOD FOR MAKING WELD NUTS
Filed May 23, 1963 3 Sheets-Sheet 3

INVENTORS
EDWARD A. ANDERSON
BY AUGUST S. CLAUSE
Williams, David,
Hoffmann & Yount
ATTORNEYS United States Patent Office 3,251,079
Patented May 17, 1966

3,251,079
APPARATUS AND METHOD FOR MAKING WELD NUTS
Edward A. Anderson, Cleveland Heights, and August S. Clause, Stow, Ohio, assignors to The Lamson & Sessions Co., Cleveland, Ohio, a corporation of Ohio
Filed May 23, 1963, Ser. No. 282,805
18 Claims. (Cl. 10—72)

This invention relates to the production of weld nuts of the kind having welding projections and, more particularly, to novel apparatus for producing such weld nuts. This application is a continuation-in-part of application Serial No. 405,648, filed October 12, 1964, and which is a continuation of an earlier application Serial No. 93,396, filed March 6, 1961, now abandoned, covering such a weld nut and a method for producing the same from bar stock, and applicants claim the benefit of the filing date of application Serial No. 93,396 for all common subject matter.

An object of the present invention is to provide novel apparatus for producing weld nuts directly from bar stock having projecting bosses at spaced points therealong, comprising means for severing nut bodies from the lead-end of the stock by cutting the stock transversely through such bosses so that portions of the bosses remain on the severed nut body as welding projections.

Another object is to provide novel apparatus for producing weld nuts directly from bar stock comprising means for forming projecting bosses on the stock at spaced points therealong, and means for severing nut bodies from the lead-end by cutting the stock transversely through the bosses.

A further object is to provide novel weld nut apparatus of the character just above referred to having tool member means carrying forming means of convexly curved shape, and means for causing the forming means to indent the stock by movement in an inward direction relative to a side surface thereof and displace metal by pushing the same in an upward direction relative to the top surface of the stock to form the projecting boss.

Still another object is to provide such novel weld nut apparatus having a pair of tool members mounted for closing relative movement transversely to the direction of longitudinal feed movement of the stock, so that the inward and upward movements of the forming means relative to the side and top surfaces are components of a swinging movement of the forming means along a path inclined to the plane of the side surface of the stock.

Yet another object is to provide novel weld nut apparatus of the character mentioned above and in which the forming means comprises a ball-shaped element.

The present invention also provides a new and improved method of indenting metal stock to form a nut body having a welding boss thereon, and in which the welding boss is formed by engaging an area on a first side of the bar stock spaced inwardly from a corner edge formed by the intersection of the first side and a second side and indenting the first side to form an arched welding boss projecting outwardly from the second side, flattening the tops of the projection to form a flattened welding boss and severing the stock through the boss to provide a nut body with a welding boss on its corner and with the indenting being done in a manner such that the welding boss is disposed symmetrically at the corner of the nut body and has sides which lie substantially in the plane of the nut sides at the corner.

Additionally, this invention provides novel weld nut apparatus as hereinabove referred to wherein die means for severing the nut bodies from the lead-end of the stock includes punch means adapted to further shape the welding projections by the pressure of the punch in severing the nut bodies from the stock.

Other objects, novel characteristics and advantages of this invention will be apparent in the following detailed description and in the accompanying drawings forming a part of this specification and in which:

FIG. 1 is a side elevation showing the novel apparatus for producing weld nuts but with the stock guiding and feeding rolls omitted;

FIG. 2 is a partial vertical section taken as indicated by section line 2—2 of FIG. 1;

FIG. 5 is a perspective view showing a guide and stop member of the apparatus in a detached relation;

FIG. 6 is an end view of the punch member which severs the nut bodies from the lead-end of the stock;

FIG. 7 is a side elevation of the same punch member;

FIG. 8 is a partial axial section of the punch member taken on section line 8—8 of FIG. 6;

FIG. 9 is a partial end view of the punch member showing one corner portion thereof on a larger scale;

FIG. 10 is a fragmentary sectional view taken on line 10—10 of FIG. 9;

Figure 3:
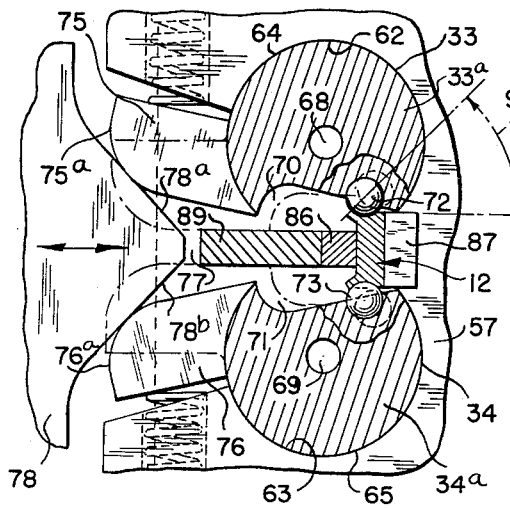
FIG. 3 is a fragmentary vertical section taken on section line 3—3 of FIG. 2 and showing the tool members in an actuated position with the forming means thereof indented into the stock.
Figure 11:
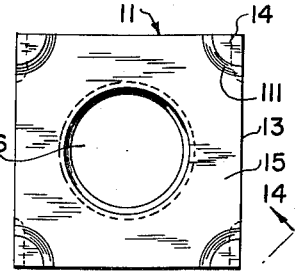
FIG. 11 is a top plan view of the completed weld nut.
Figure 12:
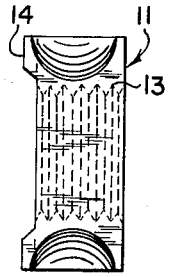
FIGS. 12 and 13 are side elevations of the weld nut.
Figure 13:
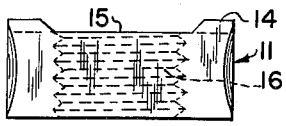
Figure 14:
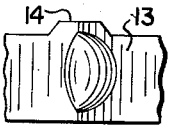
FIG. 14 is an elevation of a corner of the weld nut when viewed as indicated by the line 14—14 of FIG. 11.

As a preferred embodiment of the present invention, the accompanying drawings show novel apparatus 10 for producing weld nuts 11 directly from metal bar stock 12. The weld nut produced in this instance is of the form shown in FIGS. 11 to 14 and has a body 13 of quadrangular plan shape with welding projections 14 located at the four corners and rising above the end face 15. A tap opening 16 is located substantially centrally of the group of welding projections 14.

Figure 15:
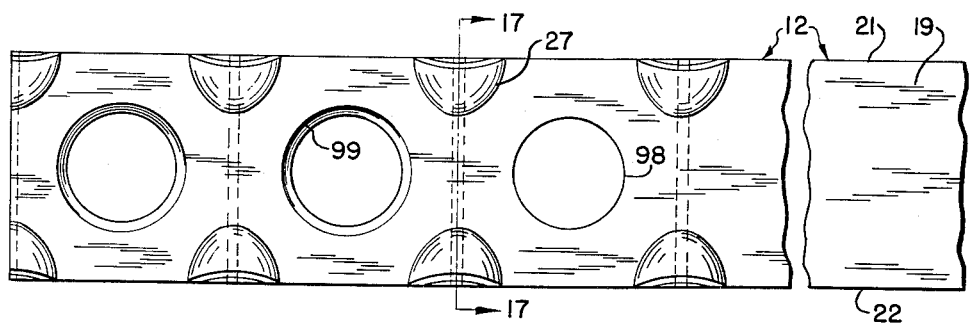
FIG. 15 is a plan view showing the stock strip with the elevated bosses on a portion thereof.
Figure 16:
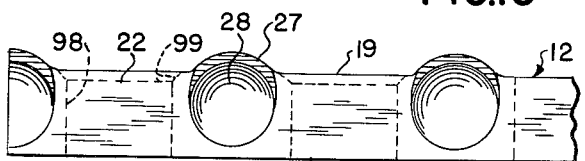
FIG. 16 is a partial side elevation of the stock strip.
Figure 17:
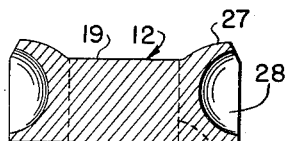
FIG. 17 is a cross-section of the stock strip taken through a pair of the bosses thereof as indicated by section line 17—17 of FIG. 15.
Figure 4:
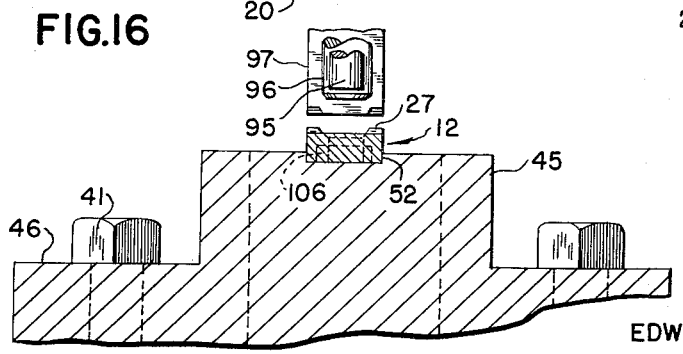
FIG. 4 is another partial vertical section taken on section line 4—4 of FIG. 2.

As show in FIGS. 1, 2 and 15 the stock 12 is initially in the form of a strip having flat longitudinal top and bottom surfaces 19, 20 and a pair of flat longitudinal side surfaces 21, 22 on laterally opposite sides thereof. The side surfaces 21, 22 are in a perpendicular relation to the top and bottom surfaces 19, 20 and the intersections of these surfaces define a pair of upper and lower longitudinal corners 23 and 24 along both side of the strip (see FIG. 1).

As will be explained in detail hereinafter, the apparatus 10 operates on the stock 12 to form bosses 27 thereon at spaced points therealong which are comprised of metal displaced by forming indentations 28 in the side surfaces of the stock. The bosses 27 rise above the top surface 19 and are here shown as comprising pairs of such bosses spaced apart transversely of the stock 12. As will also be explained in detail hereinafter, the apparatus 10 severs the weld nuts 11 from the lead-end 29 of the stock 12 by cutting the stock transversely through the pairs of bosses 27 so that portions of the bosses remain on each severed nut body 13 as the welding projections 14.

The apparatus 10 is here shown as being used in a machine 31 of the punch-press type and comprises, in general, a preassembled die unit 32 having a pair of tool members 33 and 34 for operating on the stock 12, and a reciprocably movable actuating means 35 for co-operation with the tool members for imparting the desired operating movement thereto.

The machine 31 is here represented by a partial showing of the frame 37 thereof which is of the type having a gap 38 providing a work area, and mounting and guideway portions 39 and 40 on opposite sides of such gap. The die unit 32 is located in the gap 38 and secured to the mounting portion 39 as by means of suitable screws 41. The actuating means 35 is carried by the ram 42 of the machine 31 and is suitably mounted thereon as by means of screws or the like 43. The actuating means 35 also serves as a holder for certain punches to be described hereinafter.

The unit 32 comprises a die block 45 having flange-like mounting portions 46 through which the screws 41 extend, and a sandwich-like subassembly 49 attached to the die block as by suitable connecting screws 50 and having the tool members 33 and 34 pivotally mounted therein. The subassembly 49 has an opening 51 therein to accommodate a forward endwise feed movement of the stock 12, and the die block 45 has a channel-shaped guideway 52 therein which the bottom portion of the stock is movable during such endwise feeding movement. The feeding movement can be imparted to the stock 12 by a pair of suitable feed rolls 53 (see FIG. 2). The feed rolls 53 are here shown mounted on the subassembly 49 by a pair of brackets 54, 55 and are suitably driven as by gearing 56.

The subassembly 49 comprises a plate-like body 57, and a pair of cover plates 58 and 59 located on opposite sides thereof and secured thereto as by means of suitable screws 60 and 61. The body 57 and the cover plates 58, 59 have sockets 62 and 63 therein in which the tool members 33 and 34 are rockably supported and which sockets are located adjacent the passage 51 so as to lie on opposite sides of the stock 12. The sockets 62 and 63 are defined by bearing portions 64 and 65 of a concave circular curvature provided on the body member 57 and on the cover plates 58 and 59. The socket openings of the body member 57 and the cover plates 58 and 59 are all in a flushly aligned relation so that the walls of the sockets 62 and 63 provide bearing surfaces which extend in a continuous relation through the subassembly 49 in the direction of the longitudinal feeding movement of the stock 12.

The tool members 33 and 34 have body portions 33ª and 34ª of a convex circular curvature which are of approximately the same axial length as, and extend through, the sockets 62, 63 of the subassembly 49 so that the tool members are well supported by, and rockable in, such sockets. The rocking of the body portions 33ª and 34ª is a pivotal movement about parallel pivot axes 68 and 69, although the tool members are actually supported by their rockable engagement in the sockets 62 and 63.

The tool members 33 and 34 are notches 70 and 71 formed in the adjacent sides thereof and carry forming portions or elements 72 and 73 of convex curvature which projects into these notches for forming engagement with the opposite lateral sides 21 and 22 of the stock 12. The forming elements 72 and 73 are further described hereinafter.

The tool members 33 and 34 also have lever portions 75 and 76 projecting from the body portions 33ª and 34ª so as to extend in a spaced relation toward the actuating means 35. The lever portions 75 and 76 are of a shorter width than the axial length of the body portions 33ª and 34ª and, as shown in FIG. 2, lie between the cover plates 58, 59 and prevent the body portions from moving axially out of their sockets 62 and 63. The spaced relation of the lever portions 75 and 76 provides an entry opening 77 therebetween for receiving a cam member 78 of the actuating means 35. The lever portions 75 and 76 include curved portions 75ª and 76ª with which the oppositely inclined cam surfaces 78ª and 78ᵇ of the cam member 78 wedgingly co-operate, upon entering movement of the cam members into the space 77, for imparting the rocking movement to the tool members 33 and 34.

In FIG. 1 the tool members 33 and 34 are shown in their retracted or rest position in which the forming elements 72 and 73 are disengaged from the stock 12 and at which time the cam member 78 has been retracted by the ram 42 and has been disengaged from the lever portions 75 and 76. The tool members 33 and 34 are normally urged toward their rest position by compression springs 80 and 81 located in openings 82 and 83 provided in the body member 57. The springs 80 and 81 have their adjacent or inner ends in engagement with the arm portions 75 and 76 while their outer or remote ends are in engagement with spring seats formed by plugs 84 mounted in threaded openings of the body member 57.

The forming elements 72 and 73 have a substantially spherical convex curvature on the portions thereof projecting into the notches 70 and 71. The elements 72 and 73 are here shown as being hardened metal balls suitably mounted in the body portions of the tool members 33 and 34 at points spaced from their pivot axes 68 and 69 so that the rocking movement of the tool members about the pivot axes will cause swinging of the forming elements toward and away from the side surfaces 21 and 22 of the stock 12.

FIG. 3 of the drawings shows the tool members 33 and 34 in their actuated position in which a closing relative swinging movement of the forming elements 72 and 73 has caused the same to engage and indent the side surfaces 21 and 22 of the stock 12. This closing swinging movement of the forming elements results from the co-operation of the cam member 78 with the curved portions 75ª and 76ª by which the lever portions 75 and 76 have been spread apart, as shown in FIG. 3, by the wedging action of the cam member.

During the indenting of the stock 12 by the closing relative swinging movement thus imparted to the forming elements 72 and 73, the stock is held against displacement by a pair of guide elements 86 and 87 provided in the passage 51 and engaged by the top and bottom surfaces 19 and 20 of the stock strip. The guide elements 86 and 87 are hardened metal segments suitably mounted on adjacent portions of the subassembly 49. The guide element 86 is here shown as carried by the web portion 89 of a bracket 88 which is attached to the subassembly 49 by suitable screws 90.

The position in which the bracket 88 is mounted is with the web portion 89 extending into the space 77 and with a mounting flange portion 91 of the bracket secured against the cover plate 59 by the screws 90. In addition to providing a support for the guide element 86, the web portion 89 of the bracket 88 serves as a stop for the lever portions 75 and 76 of the tool members 33 and 34. When the lever portions 75 and 76 are pressed against the web portion 89 of the bracket by the springs 80 and 81, the forming elements 72 and 73 will be fully retracted away from the stock 12, as shown in FIG. 1.

The guide element 87 is suitably secured on the body member 57 of the subassembly 49 directly opposite the guide element 86 and is engaged by the longitudinal bottom surface 20 of the stock 12. The guide elements 86 and 87 thus receive the stock 12 therebetween and hold the stock during the indenting thereof by the forming elements 72 and 73 so that the closing swinging movement of these elements has a definite direction relative to the held stock with the elements engaging the side surfaces 21 and 22 of the stock at points spaced from the lower corners 27.

By referring to FIG. 3 of the drawings it can be seen that, during the relative closing swinging movement of the forming elements 72 and 73, these elements follow paths of movement which are inclined to the planes of the side surfaces 21 and 22 at approximately 45 degrees as is indicated by the angular distance 93. This swinging movement of the forming elements 72 and 73 along paths extending in this angular relation to the side surfaces 21 and 22 results in a component of movement for each identing element which is in an inward direction relative to a side surface of the stock and another component of movement which is in an upward direction relative to the top surface 19. These movement components for the forming elements 72, 73 cause the elements to indent the stock by forming the recesses 28 in the sides thereof and, in so doing, the elements displace metal by pushing the same in an upward direction relative to the top surface 19 to cause the bosses 27 to rise above the latter.

The apparatus 10 also includes punches 95, 96 and 97 which are carried by the ram 42 and are moved thereby into engagement with the stock 12 during the same ram movement which causes the cam member 78 to actuate the tool members 33 and 34. The punch 95 punches holes 98 in the stock 12 for the tap openings 16 of the weld nuts 11. The punch 96 is of a shape to form chamfers 99 on the stock around the previously punches holes 98. The punch 97 is of a substantially square shape and operates to sever the nut bodies 13 in succession from the lead-end 29 by cutting the stock transversely through the pairs of bosses 27.

At a location opposite the punch member 97 the die block 45 is provided with a die insert 101 having an opening 102 of a size and shape to receive the work-engaging end of this punch and through which the severed nut body 13 can be discharged from the apparatus. The die insert 101 has shearing edges 103 and 104 located on opposite sides of the opening 102 so that, when the lead-end 29 spans the opening, pairs of the bosses 27 will lie immediately above these shearing edges. When the stock 12 is advanced to locate the lead-end 29 in such a spanning relation to the die opening 102, the end of the stock engages a suitable feed stop 106 located adjacent the die opening.

The feed stop 106 is spaced from the shearing edge 104 a short distance so that, when the stock is cut transversely by the punch 97, the stock is sheared at the two locations represented by the shearing edges 103 and 104. This results in a small slug 107 of scrap metal being sheared from the lead-end 29 each time that a nut body 13 is cut from the stock. Although the feed stop 106 facilitates the correct positioning of the lead-end 29 for the cut-off operation of the punch 97, the feed stop can be omitted if desired.

The work-engaging end of the punch 97 performs a further shaping operation on the bosses 27 while the nut body 13 is being severed from the lead-end 29, and the force with which the punch is actuated to sever the nut body from the stock is utilized for this further shaping of the bosses. To accomplish this further shaping of the bosses 27, the corner portions of the punch 97 are provided with recesses 108 as shown in FIGS. 6 to 10 and each recess has a flat bottom wall 109 and a curved inclined side wall 110. Portions of the bosses 27 are received in the recess 108 during the shearing of the stock by the punch 97 and the resulting pressure-forming of the bosses causes flattening of the tops thereof by the flat bottom walls 109 of the recesses.

The inclined and curved side walls 110 of the recesses 108 serve to shape the bosses 27 on the sides thereof facing the tap opening 16 so that the bosses then have a corresponding curved and inclined inner side wall 111. This further shaping of the bosses 27 results in the welding projections 14 being given a desired regular form, and also results in the projections being located more precisely on the corners of the weld nut 11 as shown in FIGS. 11 to 14. The end of the punch 97, other than the corner recesses 108, is defined by a flat end surface 112 which engages the end face 15 of the nut body 13 for the shearing of the latter from the stock 12.

Since the engagement of the forming elements 72 and 73 of the tool members with the sides 21 and 22 of the stock 12 takes place at points spaced above the lower corners 24 and the direction of the subsequent indenting movement of the elements is inwardly and upwardly, there will be no distortion of the stock in or adjacent the plane of the lower lonigtudinal surface 20. Likewise, the punch 97 performs its function of severing the nut body 13 from the lead-end 29 as well as the above-described further shaping of the bosses 27, without causing any distortion of the tap opening 16. The weld nut 11 will accordingly be of a desired regular and uniform shape which is important for efficient handling and processing of the weld nuts in existing apparatus.

From the accompanying drawings and the foregoing detailed description it will now be readily understood that this invention provides novel method and apparatus for producing weld nuts directly from bar stock in a rapid and economical manner. It will now also be understood that the apparatus forms bosses on a stock strip by pushing metal upwardly above the top surface of the stock and then shears the stock transversely through pairs of such bosses so that portions of the bosses remaining on each severed nut body provide the desired welding projections thereon.

It will now be further understood that the forming of the bosses on the stock strip is accomplished by forming elements of convex curvature which indent the stock and displace metal thereof by movement of such elements into the stock in an inward direction relative to the side surfaces and an upward direction relative to the top surface. Since the indenting of the stock by the forming elements in forming the bosses takes place at locations above the plane of the bottom surface of the stock, the weld nuts obtained will be of a good regular shape at the end remote from the welding projections so that the weld nuts will have good feeding characteristics for facilitating the feeding and handling thereof in the further processing and mounting of the weld nuts. Additionally, it will be understood that the forming of the welding projections is accomplished without distorting the portion of the nut body in which the tap opening 16 is located, and that further shaping of the welding projections to a desired regular flat-topped form and corner location on the nut body is achieved by the same punch that severs the nut bodies from the stock.

Although the apparatus of this invention has been illustrated and described herein to a somewhat detailed extent, it will be understood, of course, that the invention is not to be regarded as being limited correspondingly in scope but includes all changes and modifications coming within the terms of the claims hereof.

Having described our invention, we claim:

1. An apparatus for producing weld nut bodies from metal bar stock having a longitudinal top surface and a longitudinal side surface and longitudinal upper and lower corners along the top and bottom edges of said side surface comprising; support means for supporting said bar stock and providing for endwise feeding movement of said stock; a tool member adjacent said side surface of said bar stock and movable relative to said support means toward and away from said side surface and having forming means for forming a recess in the side surface which has a bottom facing outwardly of the side surface; means constraining said tool member for movement relative to said support means toward said side surface along a path extending transversely to the plane of said side surface and which intersects said side surface at a location of the latter spaced above the lower corner to cause the forming means thereof to engage said side surface at a location of the latter spaced above the lower corner and to indent said side surface to form said recess by pushing metal inwardly relative to said side surface and to displace the metal upwardly relative to said top surface to form a welding boss of outwardly displaced metal projecting above the top surface and extending on opposite sides of a transverse plane extending through the bar stock at about the center of the location where the side surface is initially engaged by the forming means; actuating means effective on said tool member for moving said tool members along said path to cause said forming means to engage and indent said stock, and means for severing said bar stock into a nut body by cutting said bar stock substantially along said transverse plane extending through said welding boss to part said welding boss so that portions of said welding boss remain on adjacent nut bodies as welding projections.

2. An apparatus for producing weld nut bodies from metal bar stock having a longitudinal top surface and a longitudinal side surface and longitudinal upper and lower corners along the top and bottom edges of said side surface comprising; support means for supporting said bar stock and providing for endwise feeding movement of said stock; a tool member adjacent said side surface of said bar stock and movable relative to said support means toward and away from said side surface and having forming means of convex curvature for forming a recess in the side surface which has a concavely curved bottom facing outwardly of the side surface; means constraining said tool member for movement relative to said support means toward said side surface along a path extending transversely to the plane of said side surface and which intersects said side surface at a location of the latter spaced above the lower corner to cause the forming means thereof to engage said side surface at a location of the latter spaced above the lower corner and to indent said side surface to form said recess by pushing metal inwardly relative to said side surface and to displace the metal upwardly relative to said top surface to form a welding boss of outwardly displaced metal projecting above the top surface and extending on opposite sides of a transverse plane extending through the bar stock at about the center of the location where the side surface is initially engaged by the forming means; actuating means effective on said tool member for moving said tool members along said path to cause said forming means to engage and indent said stock, and means for severing said bar stock into a nut body by cutting said bar stock substantially along said transverse plane extending through said welding boss to part said welding boss so that portions of said welding boss remain on adjacent nut bodies as welding projections.

3. An apparatus for producing weld nut bodies from metal bar stock having a longitudinal top surface and opposed longitudinal side surfaces and longitudinal upper and lower corners along the top and bottom edges of said side surfaces comprising; support means for supporting said bar stock and providing for endwise feeding movement of said bar stock; a pair of laterally opposed tool members on opposite sides of said bar stock and movable relative to said support means toward and away from said side surfaces and having forming means of convex curvature for forming recesses in the side surfaces which have concavely curved bottoms facing outwardly of the side surfaces; means constraining said tool members for movement relative to said support means toward said side surfaces along paths extending transversely to the planes of said side surfaces and which intersect said side surfaces at locations of the latter spaced above the lower corners to cause the forming means thereof to engage said side surfaces at locations of the later spaced above the lower corner and to indent said side surfaces to form said recesses by pushing metal inwardly relative to said side surface and to displace the metal upwardly relative to said top surface to form opposed welding bosses of outwardly displaced metal projecting above the top surface and extending on opposite sides of a transverse plane extending transversely through the bar stock at about the center of the location where the side surfaces are initially engaged by the forming means; actuating means effective on said tool members for simultaneously moving said tool members along said paths to cause said forming means to simultaneously engage and indent said stock; and means for severing said bar stock into nut bodies by cutting the bar stock substantially along said transverse plane extending through said opposed welding bosses to part said welding bosses so that portion of said welding bosses remain on the adjacent nut bodies as welding projections.

4. Apparatus according to claim 3 wherein the planes of said top and side surfaces are perpendicular to each other and the paths of the indenting movement of said tool members are inclined at approximately 45 degrees to the plane of said side surface.

5. Apparatus according to claim 3 wherein said forming means are of substantially spherical shape on the stock-engaging sides thereof.

6. Apparatus according to claim 3 wherein said forming means comprises hardened ball-shaped elements mounted on said tool members.

7. An apparatus for producing weld nuts, as defined in claim 3, wherein said means for severing said bar stock into the nut bodies includes a die having spaced shearing edges and an opening therebetween, said opening being of a size and location to be spanned by the lead end of said side so that opposed pairs of said bosses overlie said shearing edges, and a punch movable toward said opening and cooperable with said shearing edges for severing a nut body from the lead end by cutting the stock transversely through said bosses so that portions of said bosses remain on severed nut bodies as welding projections.

8. An apparatus for producing weld nuts, as defined in claim 7, wherein said punch has recesses located to receive portions of said bosses, said recesses having flat bottom walls for flattening the tops of said projections during the severing of the nut body from the lead end.

9. An apparatus for producing weld nuts, as defined in claim 8, including means for punching a tap opening in said bar stock in a substantially centered relation to a group of said bosses comprising two pairs of said bosses, and wherein said recess on said punch have inclined side walls of a curved shape for forming curved bevels on the side of said projections facing said tap opening during the severing of the nut body from the lead end.

10. An apparatus for producing weld nuts from metal bar stock having a longitudinal top surface and opposed longitudinal side surfaces and longitudinal upper and lower corners along the top and bottom edges of said side surfaces comprising; support means for supporting said bar stock and providing for endwise feeding movement of said bar stock; a pair of laterally opposed tool members on opposite sides of said bar stock and having forming means of convex curvature for forming recesses in the side surfaces which have concavely curved bottoms facing outwardly of the side surfaces; means mounting said tool members for pivotal movement relative to said support means for swinging said forming means toward and away from said side surfaces of said stock; the location of the forming means relative to the pivotal axis of the tool members and the position of said stock being such that the swinging of the forming means are along arcuate paths which intersect said side surfaces at a location spaced above the lower corners of said side surfaces and which extend inwardly relative to said side surfaces; and actuating means effective on said tool members for moving said tool members along said paths to cause said forming means to be swung along said paths to engage said side surfaces at a location spaced above the lower corners thereof and to indent said side surfaces to form said recesses by pushing metal inwardly relative to said side surfaces and upwardly relative to said top surfaces to displace the metal outwardly of said top surface to form opposed welding bosses of outwardly displaced metal projecting above the longitudinal top surface and extending on opposite sides of a plane extending transversely through the bar stock at about the center of the locations where said side surfaces are initially engaged by the forming means; and means for severing bar stock into nut bodies by cutting the bar stock substantially along said transverse planes which pass through said opposed welding bosses to part said welding bosses so that portions of said welding bosses remain on adjacent nut bodies as welding projections.

11. An apparatus for forming elevated arched welding bosses on the longitudinal top surface of metal bar stock to be cut transversely into weld nut bodies, and which stock also has a longitudinal side surface and longitudinal upper and lower corners along the top and bottom edges of said side surface; support means for supporting the bar stock and providing for endwise feeding movement thereof; a tool member adjacent said side surface of said bar stock and having forming means of convexly curved shaped for forming a recess in the side surface which has a concavely curved bottom facing outwardly of the side surface; means mounting said tool member for pivotal movement relative to said support means for swinging said forming means toward and away from said longitudinal side surface of said stock along an arcuate path which extends transversely to the planes of said side and top surfaces and which intersects said side and top surfaces; the location of said forming means relative to the pivotal axis of the tool member and the position of said stock being such that said swinging of the forming means along said arcuate path causes the latter to engage the side surface at a location spaced upwardly from the lower edge thereof and to indent said side surface and interrupt the upper longitudinal corner to form said recess which extends from a location spaced upwardly from the lower corner to a location spaced upwardly from the top surface by pushing metal inwardly relative to said side surface and upwardly relative to said top surface to displace the metal outwardly of said top surface only to form an arched elevated welding boss of outwardly displaced metal projecting above said top surface; and actuating means effective on said tool member for moving said tool member relative to said support means and for causing said forming means to be swung along said path.

12. An apparatus for forming elevated arched welding bosses on the longitudinal top surface of metal bar stock to be cut transversely into weld nut bodies, and which stock also has a pair of opposed longitudinal side surfaces and longitudinal upper and lower corners along the top and bottom edges of said side surfaces; support means for supporting the bar stock and providing for intermittent endwise feeding movement thereof; a pair of laterally opposed tool members on opposite sides of said bar stock and having forming means of convexly curved shape for forming recesses in said side surfaces which have a concavely curved bottom facing outwardly of said side surfaces; means mounting said tool members for pivotal movement relative to said support means for swinging said forming means toward and away from the adjacent longitudinal side surfaces of the stock and along arcuate paths which extend transversely to the planes of said side and top surfaces and which intersect said side and top surfaces; the location of said forming means relative to the pivotal axes of said tool members and the position of said stock being such that said swinging of said forming means along said arcuate paths toward said side surfaces causes the latter to engage the side surfaces at locations spaced upwardly from the lower edge thereof and to indent said side surfaces and interrupt the upper longitudinal corners to form said recesses which extend from locations spaced upwardly from the bottom corner to locations spaced upwardly from the top surface by pushing metal inwardly relative to said side surfaces and upwardly relative to said top surface to displace the metal outwardly of said top surface only to form laterally opposed arched elevated welding bosses of outwardly displaced metal projecting above said top surface; and actuating means effective on said tool members for simultaneously pivoting said tool members relative to said supporting means for causing said swinging of said forming means along said paths.

13. In an apparatus, as defined in claim 12, wherein said forming means comprises hardened ball-shaped elements mounted on said tool members.

14. Apparatus according to claim 12 wherein the arcuate paths of movement of said forming means are inclined at approximately 45 degrees to the planes of said side surfaces.

15. In apparatus for forming opposed elevated welding bosses on the longitudinal top surface of metal bar stock to be cut transversely into weld nut bodies, and which stock also has a pair of laterally opposed side surfaces; support means having opening means for an endwise feed movement of said stock therethrough including a pair of sockets having bearing portions of concave circular curvature which face one another; a pair of tool members having body portions of convex circular curvature journaled on said bearing portions for pivotal movement in said sockets; arm portions connected with said body portions; actuating means effective on said arm portions for simultaneously causing said pivotal movement of said tool members; and ball-shaped forming elements on adjacent sides of said body portions and located for relative swinging in a closing direction in response to said pivotal movement and engaging and indenting said side surfaces to push and displace metal inwardly relative to said side surfaces and upwardly relative to said top surface to form opposed elevated welding bosses of outwardly displaced metal projecting above the top surface.

16. Apparatus according to claim 15 wherein said actuating means comprises cam means for simultaneous wedging engagement with said arm portions.

17. A method of indenting metal stock for a nut body to form a welding boss thereon comprising, engaging an area on a first side of the metal stock which is spaced inwardly along the side from a corner edge of said metal stock formed by the first side and a second of said bar stock to displace metal inwardly of the plane of the first side in directions to form a recess in the side and effect displacement of the corner portion of the stock above the recess outwardly of the second side to provide an arched projection while maintaining the corner edge of the corner portion substantially intact, flattening the tops of the projection to form a flattened welding boss, and severing the metal stock through the projection to provide a nut body with a corner at the projection and a third side extending generally perpendicular to said first and second sides and to provide a welding projection on the corner of the nut body which is symmetrically disposed with respect to the corner and which has sides lying substantially in the plane of the first and third sides of the nut body.

18. A method of indenting metal stock for a nut body to form a welding boss thereon comprising, engaging an area on a first side of the metal stock which is spaced inwardly along the side from a corner edge of said metal stock formed by the first side and a second of said bar stock to displace metal inwardly of the plane of the first side in directions to form a recess in the side which is curved about an axis extending approximately directly outwardly of the first side and effect displacement of the corner portion of the stock above the recess outwardly of the second side to provide an arched projection while maintaining the corner edge of the corner portion substantially intact and the side portions defining the corner edge at the arched projection at approximately their same relative angular position, flattening the tops of the projection to form a flattened welding boss, and severing the metal stock through the projection to provide a nut body with a corner at the projection and a third side extending generally perpendicular to said first and second sides and to provide a welding projection on the corner of the nut body which is symmetrically disposed with respect to the corner and which has sides lying substantially in the plane of the first and third sides of the nut body.

References Cited by the Examiner

UNITED STATES PATENTS

| | | | |
|---|---|---|---|
| 1,206,252 | 11/1916 | Rigney | 10—76 |
| 1,804,579 | 5/1931 | Ward | 10—76 |
| 1,912,971 | 6/1933 | Claeson | 10—72 |
| 1,982,054 | 11/1934 | Hogue | 10—72 |
| 2,337,797 | 12/1943 | Brackett | 10—85 |
| 2,568,440 | 9/1951 | Freedman | 10—85 |
| 2,739,377 | 3/1956 | Carlyle | 10—86 |

FOREIGN PATENTS 926,144    5/1963    Great Britain.

ANDREW R. JUHASZ, *Primary Examiner.*